United States Patent [19]

Ojima

[11] 4,425,104
[45] Jan. 10, 1984

[54] LOCKING MECHANISM IN TENSION PROVIDING DEVICE

[75] Inventor: Juji Ojima, Ebina, Japan

[73] Assignee: NHK Spring Co., Ltd., Yokohama, Japan

[21] Appl. No.: 261,667

[22] Filed: May 7, 1981

[30] Foreign Application Priority Data

May 8, 1980 [JP] Japan .............................. 55-63045[U]

[51] Int. Cl.³ .......................... F16H 7/08; F03G 1/10
[52] U.S. Cl. ........................................ 474/111; 185/37
[58] Field of Search .................. 474/111, 140; 185/37, 185/39, 45

[56] References Cited

U.S. PATENT DOCUMENTS

| | | | |
|---|---|---|---|
| 1,988,421 | 1/1935 | McCann et al. | 474/111 |
| 3,111,039 | 11/1963 | Peras | 474/111 |
| 3,120,291 | 2/1964 | Nicholas et al. | 185/45 X |
| 3,830,114 | 8/1974 | Daines | 474/111 |

FOREIGN PATENT DOCUMENTS 45-15773 2/1970 Japan .................................. 474/111

*Primary Examiner*—Allan D. Herrmann
*Attorney, Agent, or Firm*—Fleit, Jacobson, Cohn & Price

[57] ABSTRACT

A tension providing device is adapted to change a rotation force due to a spring torque of a shaft to a pushing force in the direction of an axial line of a piston. At one end of the above shaft, a split groove is formed, and at a position corresponds to an axial center of the shaft attached to a lid of a casing body which forms an outer shell of said device, a penetrated hole having an appropriate size and shape is provided. The rotation of the shaft is locked or unlocked by a stopper member latched with said split groove and said penetrated hole removably. Further, said locking mechanism is adapted to perform winding the spring and pulling back the piston into the device by the rotation of the shaft through the penetrated hole of said lid without removing the lid of the casing using an appropriate tool.

1 Claim, 8 Drawing Figures

Fig. 3
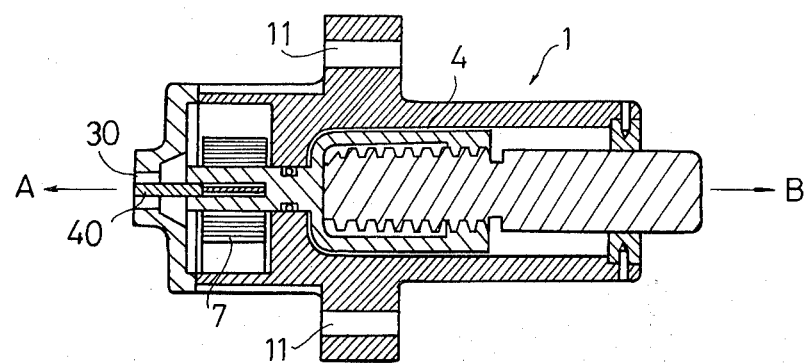
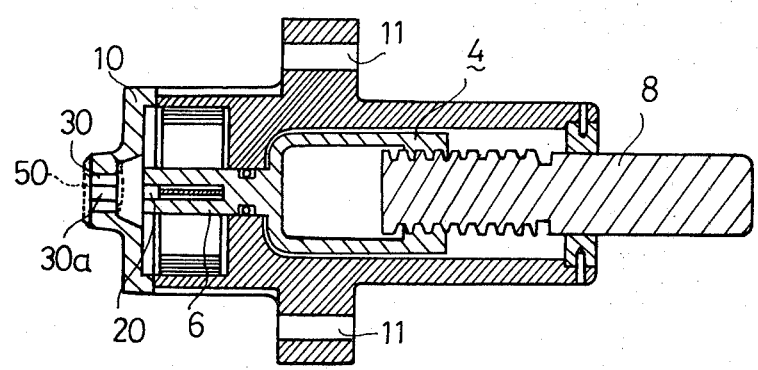
Fig. 4

A

B

LOCKING MECHANISM IN TENSION PROVIDING DEVICE

BACKGROUND OF THE INVENTION

This invention relates to a locking mechanism in a tension providing device.

Generally the "tension providing device" is a device to which a pushing force acts always in a constant direction and when an outer force acts in the counter direction against said pushing force, a characteristic nearly a rigid body is appeared.

The tension providing device is used for keeping a proper straining status continuously by pushing a chain or a belt with a pushing force having a certain direction, for instance, like a chain tensioner or a belt tensioner. In other words, the tensioner provides a certain tension to the chain or the belt pushing it in a certain direction when the chain or the belt is slackened due to the stretching or wearing during the employment. In this case, said device is desirable to have such characteristic as nearly the rigid body against the outer force in said pushing direction and the counter direction.

However, the tension providing device which satisfies the above demand is required to perform the readjustment or the like according to the elongation of the chain etc. In such case, the conventional tension providing device is obliged to be removed from the main body from the point of construction. When it is treated in a state attached to the main body, the winding of the spring is impossible without removing the lid of the casing which forms the shell of the device. Further, since the free return of the piston provided with the pushing force into the device is impossible even in case of removing the device from the main body, a reaction force always acts when the attaching bolt to the main body is slackened. Therefore, the removing work is very difficult.

Heretofore, such tension providing device is, for instance, constructed as shown in FIG. 1, and FIG. 2. The numeral 1 is a tension providing device wherein a shaft 4 is provided to a bearing 3 in casing 2 removably restricting the sliding in the axial direction. The shaft 4 is composed of a head portion 5 having a U type secton and a leg portion 6 extending outward from the bottom portion of said head 4a, the circumference of near the opening portion in said head 4a being provided with a female portion 5a and said leg portion 6 being provided with a spring 7 therein fixedly, an outer end of the spring 7 is fixed to the inner wall of case 2 suitably. The numeral 8 is a piston wherein a male portion is provided at one end thereof and another end is adapted to form a pillar 8a having a square in section. The male portion 8a of the piston 8 is secured with the female portion 5a of the shaft 4 and provided slidably in the axial direction being restricted the rotation by casing 2 supporting the pillar body 8b with the square bearing 9. At the spring 7 of the casing 2 and the opening the lid 10 is fixed with bolts 11 and 12.

BRIEF SUMMARY OF THE INVENTION

In such construction the rotative force of the shaft 4 due to the torque of the spring 7 is possible to change into the pushing force in the axial direction of the piston 8. This invention relates to a tension providing device based upon the principle of such construction.

Then, the details of this invention are explained upon examples shown by FIG. 3 to FIG. 7. Since the fundamental construction of the tension providing device used for the explanation is the same as that of the conventional example, same numerals are used for the same members and the explanation of the fundamental construction is abridged in order to avoid the duplication.

BRIEF DESCRIPTION OF THE DRAWINGS

FIG. 3 is a sectional view in locking status of FIG. 1 in line 1—1 according to this invention.

FIG. 4 is a view in locking free status in FIG. 3.

A in FIG. 5 is a left side view of FIG. 3 and B in FIG. 5 is a left side view of FIG. 4.

DETAILED DESCRIPTION OF THE INVENTION

Figure 1:
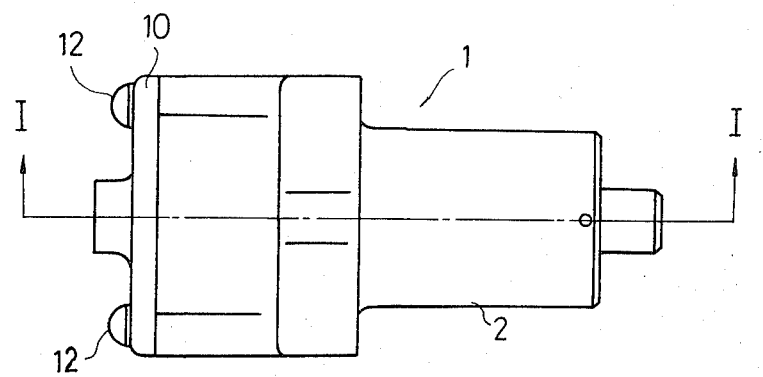
FIG. 1 is an outside appearance view of the tension providing device.
Figure 2:
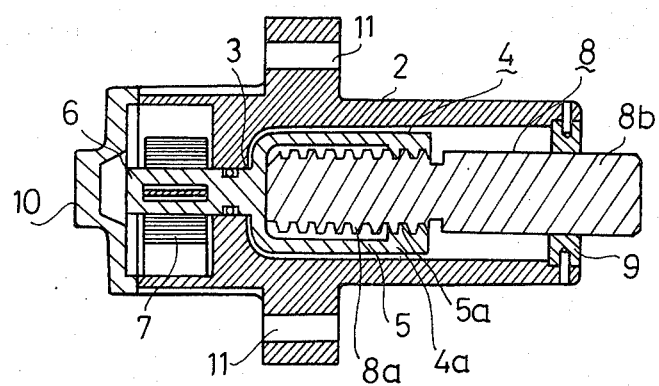
FIG. 2 is a sectional view of the conventional device in line 1—1.
Figure 5:
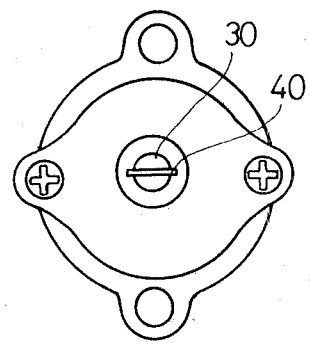
Figure 6:
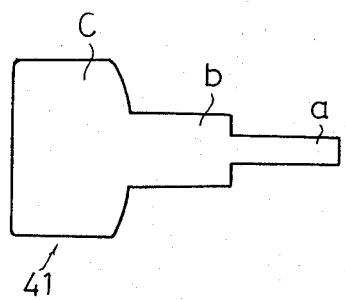
FIG. 6 is a plan view of another example of a stopper member and FIG. 7 is a side view which shows a status of use of this device.
Figure 5:
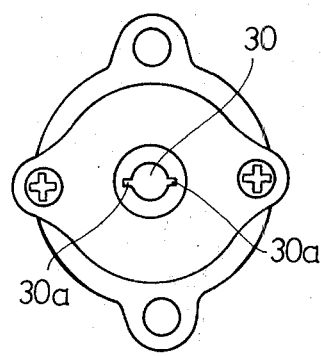

At an end of the leg portion 6 of the shaft 4 in the tension providing device 1, the split groove 20 is formed, and at the lid body 10 which forms a shell of the device 1 a longitudinal groove 30a which intersects with the diameter of the hole at right angle and a penetrated hole 30 having 30a, are provided at a position corresponds to the axial center of the shaft 4, said split groove 20, penetrated hole 30 and stopper member 40 composing the locking mechanism according to this invention. In other words, the stopper member 40 is made of plate body, one end and both sides of which are allowed to latch connectedly to the split groove 20 and the longitudinal grooves 30a and 30a of the penetrated hole 30 respectively, thereby locking the rotation caused by the spring torque of the spring 7 of the shaft 4. In this case, the latching state of the stopper member 40 to each groove 20, 30a and 30a may be loosely engaged. Even in this status, the shaft 4 is rotatively pressurized by spring 7. Since the stopper member 40 is pressed to the above each groove 20, 30a or 30a by this rotative pressurization, the shaft 40 will not fall down from the device 1. After fixing this device 1 in locking status to the main body through bolt inserting holes 11 and 11, the stopper member 40 is allowed to release from said connectedly latched state. In other words, when the stopper member 40 is pulled in a direction shown by an arrow as indicated in FIG. 3 to release the latch with the split groove 20 of shaft 4 (In this case, the latch of the stopper member 40 with the longitudinal grooves 30a and 30a may maintain as it is or the stopper member may be completely removed from the penetrated hole 30.) The shaft 40 rotates in a certain direction by the torque of spring 7 and at the same time the piston 8 advances in the direction shown by arrow B (See FIG. 3), thereby pressing the chain, belt or the like through a proper shoe.

Further, the numeral 50 is a cap made of a flexible member inserted into the penetrated hole 30 so that invaded muds and the like from the penetrated hole 30 may not obstruct the pushing function of device 1 during the employment.

Further, when the maintenance such as returning the piston 8 into the device 1 or the like is performed together with winding the spring 7, this is performed by removing the cap 50, inserting a proper tool such as a driver or the like from the penetrated hole 30, latching a top end of said tool to the split groove 20 of the shaft 4 and rotating the shaft 4 in the winding direction of the spring 7.

Accordingly, the size and the shape of said penetrated hole 30 is sufficient enough to be able to insert said tool and to perform the rotative operation of shaft 4 at will. Further, the longitudinal grooves 30a and 30a of the penetrated hole 30 are provided at two points in the opposite positions in the above examples. However, since the above longitudinal grooves 30a restrict the rotation of stopper member 40, it is needless to define the positions only at 2 points.

Further, the stopper member 40 is not defined only by a plate body described in the above example, but may be a plate body having stages, a narrow wide portion a, a middle wide portion b, and a wide portion c in order from the top end. In this case, the breadths of the narrow wide portion a and the middle wide portion b may be designed to be smaller than the diameter of the penetrated hole 30 and to be possible to insert sufficiently into each longitudinal groove 30a of the penetrated hole 30 respectively. Further, the wide portion c may be designed to be properly wide so that the operation may be easy when the shaft 4 rotates. The stopper member 41 designed in such manner is used as follows. in other words, after inserting the top end of the narrow wide portion a into the split groove 20 of the shaft 4 in slightly floating state (in this state the middle wide portion b comes out outward of the lid 10) and rotating the shaft 4 in the winding direction of the spring 7 by rotating the stopper member 41, the rotation of the shaft 4 is locked by latching both legs of the middle wide portion b with the longitudinal grooves 30a and 30a respectively together with pushing the stopper member 41 into the split groove 20 completely.

In order to release the locking, it is performed by drawing out the stopper member 41 from the split groove 20 and the longitudinal groove 30a completely, or releasing the connected latching of both grooves 20 and 30a.

Figure 7:
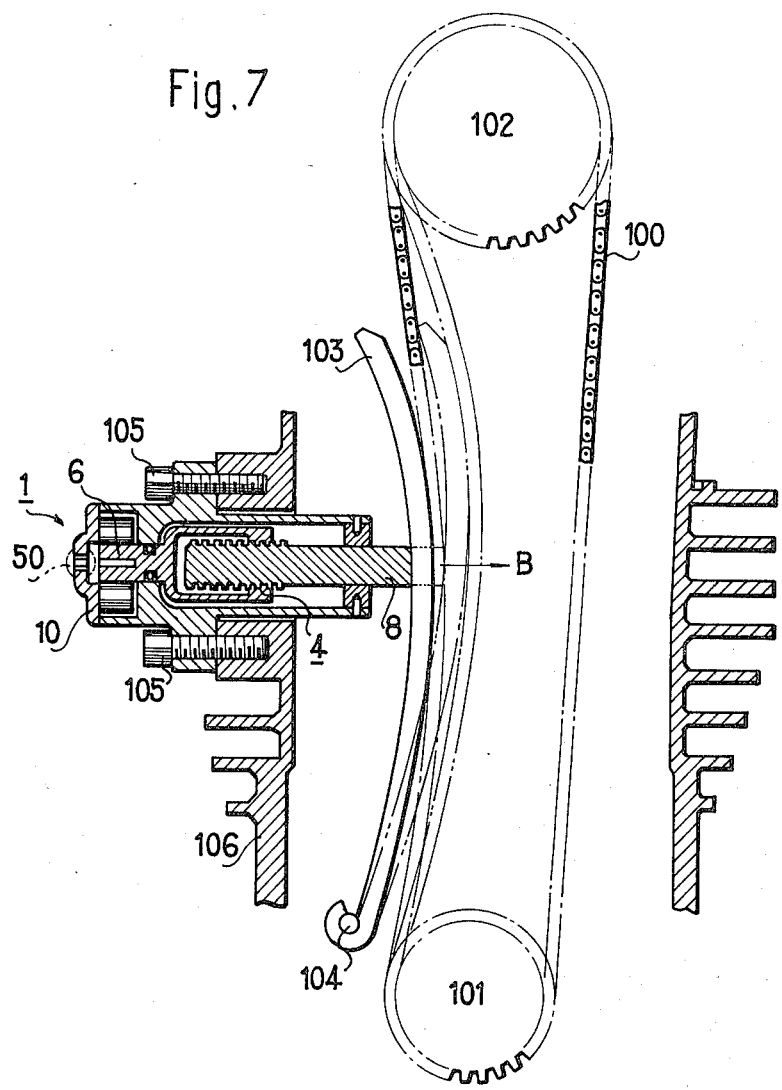

The function of the tension providing device 1 providing with the locking mechanism of this invention is described in accordance with FIG. 7.

In FIG. 7, the numeral 106 is a main body, said main body being provided with sprockets 101 and 102 having a chain 100 thereon. The numeral 103 is a shoe, said shoe 103 being supported with a supporter 104 at one end thereof and secured on its one side to the chain 100 so as to contact with it.

The tension providing device 1 is allowed to penetrate its top end into a penetrated hole of the main body 106 and is fixed to the main body 106 with bolts 105 so as to contact a top end of the piston 8 to the counter side of the shoe 103, that is, the side of the shoe not in contact with the chain 100.

The stopper member 40 or 41 is removed after fixing the tension providing device 1 to the main body 106. FIG. 7 shows a status wherein the stopper member 40 or 41 is removed.

In this status, the pushing force in the direction of an arrow B is provided to the shaft through the spiral force of the spring 7. Accordingly, when the chain 100 becomes slack, the shaft 8 is pushed out in the direction shown by arrow B according to the slackening of the chain 100, thereby always maintaining the chain 100 in a status without any slack. The status is shown by a broken line in FIG. 7.

In case of returning the shaft 8 in the counter direction, that is, the direction against that shown by arrow B, the cap 50 is removed to provide access to the split groove 20, while the tension providing device remains fixed to the main body 106. Shaft 4 is then rotated which results in translation of said shaft 8 and the storing of tension in the spring 7. The device is thereby capable of operating with ease.

The locking mechanism in accordance with this invention is possible to perform a sure locking in spite of very simple construction as described above and also possible to perform the maintenance in state that the tension providing device is attached to the main body and the lid which forms the outer shell of the device is provided. Therefore, it is very easy to deal with. Further, since the locking mechanism of this invention is not in need of the special member or working, there exists an exonomical value such as low cost or the like.

What I claim:

1. In a tension providing device comprising:
   casing means for defining a chamber;
   means having a non-circular opening formed therein for closing one end of said chamber;
   a piston having a threaded portion disposed in said chamber and a portion extending through said non-circular opening so that the piston is translatable and non-rotatable with respect to said casing means, an end portion of the piston outside of the casing means forming a tension applying member;
   shaft means supported for rotation with respect to said casing means and having a threaded head portion engaged with said threaded portion of said piston and a leg portion extending from the head portion; and
   biassing means engaged with said leg portion for exerting a biassing force on said leg portion such that rotation of said leg portion by said biassing means results in translation of said end portion of said piston,
   the improvement comprising means for preventing rotation of said leg portion including:
   a split groove formed in an end of the leg portion opposite the threaded head portion of said shaft means;
   an opening formed in said casing means in alignment with an axis of said leg portion, said opening having a groove extending into a portion of the casing means defining the opening; and
   a stopper member insertable through said opening into engagement with said split groove, a portion of said stopper member being received in said groove to thereby prevent rotation of said stopper member whereby said stopper member locks said leg portion.

* * * * *